(12) United States Patent
Chaudhuri et al.

(10) Patent No.: US 7,293,036 B2
(45) Date of Patent: Nov. 6, 2007

(54) COMPRESSING DATABASE WORKLOADS

(75) Inventors: Surajit Chaudhuri, Redmond, WA (US); Ashish Kumar Gupta, Seattle, WA (US); Vivek Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/008,335

(22) Filed: Dec. 8, 2004

(65) Prior Publication Data

US 2005/0102305 A1  May 12, 2005

Related U.S. Application Data

(63) Continuation of application No. 10/180,667, filed on Jun. 26, 2002, now Pat. No. 6,912,547.

(51) Int. Cl.
 *G06F 17/30* (2006.01)
(52) U.S. Cl. ............................. 707/101; 707/2; 707/100
(58) Field of Classification Search ............. 707/104.1, 707/3; 706/917; 709/224; 703/21
See application file for complete search history.

(56) References Cited

U.S. PATENT DOCUMENTS

| | | | |
|---|---|---|---|
| 5,761,438 A * | 6/1998 | Sasaki .......................... | 709/247 |
| 5,822,749 A * | 10/1998 | Agarwal .......................... | 707/2 |
| 5,960,423 A * | 9/1999 | Chaudhuri et al. ............. | 707/2 |
| 5,974,457 A * | 10/1999 | Waclawsky et al. ......... | 709/224 |
| 6,223,171 B1 * | 4/2001 | Chaudhuri et al. ............. | 707/2 |
| 6,363,371 B1 * | 3/2002 | Chaudhuri et al. ............. | 707/2 |
| 6,598,038 B1 * | 7/2003 | Guay et al. ..................... | 707/2 |
| 2002/0161566 A1 * | 10/2002 | Uysal et al. ................... | 703/21 |
| 2003/0204499 A1 * | 10/2003 | Shahabi et al. ................ | 707/3 |

OTHER PUBLICATIONS

Mustafa M. Tikir, & Jeffery K. Hollingsworth. Efficient Online Computation of Statement Coverage, Computer Science Dep. University of Maryland. Retrieved on Feb. 6, 2006.*
Lieven Eeckhout, Hans Vandierendonck, & Koen De Bosschere. Workload Design: Selecting Representative PrograDepartment of Electronics and Information Systems (ELIS), Ghent University, Belgium. Retrieved on Feb. 6, 2006.*
Surajit Chaudhuri, Ashish Kumar Gupta, & Vivek Narasayya. Compressing SQL workloads. ACM SIGMOD 2002, Jun. 4-6, 2002, Madison, WI, USA.*
Guido Nerjes, Peter Muth, & Gerhard Weikum. A Performance Model of Mixed-Workload Multimedia Information Servers. University of the Saarland, Dept. of Computer Science. Saarbrucken, Germany.*
S. Acharya, P.B. Gibbons and V. Poosala, "Congressional Samples for Approximate Answering of Group-By-Queries", Proceedings of the ACM SIGMOD, 2000, pp. 487-498.

(Continued)

*Primary Examiner*—Jeffrey Gaffin
*Assistant Examiner*—Neveen Abel-Jalil (57) ABSTRACT

Relational database applications such as index selection, histogram tuning, approximate query processing, and statistics selection have recognized the importance of leveraging workloads. Often these applications are presented with large workloads, i.e., a set of SQL DML statements, as input. A key factor affecting the scalability of such applications is the size of the workload. The invention concerns workload compression which helps improve the scalability of such applications. The exemplary embodiment is broadly applicable to a variety of workload-driven applications, while allowing for incorporation of application specific knowledge. The process is described in detail in the context of two workload-driven applications: index selection and approximate query processing.

43 Claims, 2 Drawing Sheets

OTHER PUBLICATIONS

A. Aboulnaga, S. Chaudhuri, "Self-Tuning Histograms: Building Histograms Without Looking at Data", Proceedings of the ACM SIGMOD, 1999, pp. 181-192.

S. Chaudhuri, V. Narasayya, "An Efficient, Cost-Driven Index Selection Tool for Microsoft SQL Server", Proceedings of the 23rd International Conference on Very Large Databases, 1997, pp. 146-155.

S. Chaudhuri, G. Das, M. Datar, R. Motowani, V. Narasayya, "Overcoming Limitations of Sampling for Aggregation Queries", Proceedings of the 17th International Conference on Data Engineering, 2001, pp. 534-542.

D. Donjerkovic, Y. Ioannidis, R. Ramakrishnan, "Dynamic Histograms: Capturing Evolving Data Sets", Proceedings of the 16th International Conference on Data Engineering, 2000.

V. Ganti, M.L. Lee, R. Ramakrishnan, "ICICLES: Self-Tuning Samples for Approximate Query Answering", Proceedings of the 26th International Conference on Very Large Databases, 2000, pp. 176-187.

P.B. Gibbons, Y. Matias, V. Poosala, "Fast Incremental Maintenance of Approximate Histograms", Proceedings of the 17th International Conference on Very Large Databases, 1997, pp. 466-475.

P.J. Haas, J.F. Naughton, S. Seshadri, L. Stokes, "Sampling-Based Estimation of the Number of Distinct Values of an Attribute", Proceedings of the 21th International Conference on Very Large Databases, 1995, pp. 311-322.

N. Bruno, S. Chaudhuri and I. Gravano, "STHoles: A Multidimensional Workload-Aware Histogram", Proceedings of the ACM SIGMOD, 2001.

M. Stillger, G. Lohman, V. Markl, M. Kandil, "LEO—DB2's LEarning Optimizer", Proceedings of the 27th International Conference on Very Large Databases, 2001.

M. Charikar, S. Guha, E. Tardos, D.B. Shmoys, "A Constant-Factor Approximation Algorithm for the k-median problem", Proceedings of the 31st Annual Symposium on Theory of Computing, 1999.

S. Chaudhuri, V. Narasayya, "Automating Statistics Management for Query Optimizers", Proceedings of the 16th International Conference on Data Engineering, 2000.

J.-H. Lin and J.S. Vitter, "$\epsilon$-Approximations with Minimum Packing Constraint Violation", Proceedings of the 24th Annual Symposium on Theory of Computing, 1992.

G. Lohman, A. Skelley, G. Valentin, M. Zuliani, D.C. Zilio, "DB2 Advisor: An Optimizer Smart Enough to Recommend its Own Indexes", Proceedings of the 16th International Conference on Data Engineering, 2000.

S. Arora, P. Raghavan, S. Rao, "Approximation Schemes for Euclidean k-medians and Related Problems", Proceedings of the 30th Annual Symposium on Theory of Computing, 1998.

"Equivalences Among Relational Expressions", A.V. Aho, Y. Sagiv and J.D. Ullman, pp. 218-246, 1979 Society for Industrial and Applied Mathematics, vol. 8, No. 1, May 1979.

"Translating SQL Into Relational Algebra: Optimization, Semantics, and Equivalence of SQL Queries", Stefano Ceri and Georg Gottlob, pp. 324-345, IEEE Transactions on Software Engineering, vol. SE-11, No. 4, Apr. 1985.

* cited by examiner

COMPRESSING DATABASE WORKLOADS

CROSS REFERENCE TO RELATED APPLICATION

This application is a continuation of U.S. patent application Ser. No. 10/180,667, filed Jun. 26, 2002, now U.S. Pat. No. 6,912,547.

FIELD OF THE INVENTION

The present invention concerns a system for compressing an initial database workload into a compressed database workload in an efficient way such that the quality of the result of an application that is run using the compressed workload instead of the initial workload is not significantly affected.

BACKGROUND ART

Information on how a computer database system is used can be important in performance tuning and management of the database system. In the context of relational databases, one specific form of usage information is the workload, which is typically a set of SQL statements executed by users of the system. Database practitioners and vendors have recognized the opportunity to tune and manage various aspects of database systems by analyzing workload information. Several workload-driven tasks have emerged recently for solving problems such as histogram tuning, improving query optimization, index selection, approximate answering of aggregation queries, and statistics selection. The term application is used to generically refer to such workload-driven tasks.

A key factor affecting the scalability of an application is the size of the workload, i.e., the number of SQL statements in the workload. In many cases, the workload consumed by the application is gathered using mechanisms in modern DBMSs that allow recording of SQL statements that execute on the server. In order to capture a representative collection of statements that execute against the system, the user of the application, such as a database administrator—could collect as the workload a log of SQL statements over a sufficiently large window of time (e.g., a day or week). Consequently, workloads tend to be large in size. Moreover, these applications often perform detailed analysis of queries in the workload and their inter-relationships, and hence their running time can be affected significantly as the workload size increases.

Operation of the applications can be sped up significantly by finding a substitute workload of smaller size (which is referred to as the compressed workload) as input, while qualitatively not degrading the result of the application. In other words, the result of the application when run on the compressed workload should be identical (or close) to the result when it is run on the original workload. It is important that this compressed workload be found efficiently, since otherwise the very purpose of using a compressed workload is defeated.

One solution to the workload compression problem is to use uniform random sampling to pick a smaller subset of the original workload. While this strategy is efficient, it is not an effective method for workload compression. The key reason for the poor compression achieved by uniform random sampling is that it is oblivious to the application for which the workload is being used, and hence ignores potentially valuable information about the statements in the workload. The invention exploits application knowledge to obtain significantly better workload compression as compared to uniform random sampling.

There have been prior art publications that use sampling in the area of databases e.g., Gibbons, P. B., Matias Y., and Poosala V. Fast Incremental Maintenance of Approximate Histograms. Proceedings of the $17^{th}$ Intl. Conference on very Large Databases, 1997. and Haas P. J., Naughton, J. F, Seshadri S., and Stokes L. Sampling based estimation of the number of distince values of an attribute. Proceedings of the $21^{st}$ Intl. Conference on Very Large Databases, 1995. However, these publications address the problem of sampling data and not the workload. Random sampling, has also been studied extensively in the statistics literature. Random sampling ignores interaction among the objects being sampled (which is the primary source of its efficiency).

Clustering has been studied in the context of machine learning and data mining. A class of prior art also exists wherein data points are in a metric space, i.e., each pair of points is assigned a distance that is symmetric and satisfies the triangle inequality. There is also prior art that evaluates query equivalence but not with a goal toward compressing a workload. One form of equivalence is when two queries are semantically identical, i.e., they return the same result. Determining equivalence does, of course, come at a cost since it could require significant computational effort.

SUMMARY OF THE INVENTION

The invention uses application knowledge in addressing a problem of workload compression. A distance function quantitatively measures the "difference" between pairs of statements with respect to the application. The distance function can take on arbitrary values—e.g., unlike Euclidean distances. The function does not have to be symmetric or satisfy the triangle inequality. This generality is important in dealing with the variety of applications that compression of a workload have applicability.

A computer database system makes use of the invention in evaluating a workload having a plurality of statements based on a task that uses the workload. An initial workload W is provided as is a distance function that evaluates a distance for pairs of statements within the workload. The distance function returns an estimate of the loss in quality for an application if the first statement is discarded from the workload but the second statement of the pair of statements is retained in a compressed workload. The process finds a compressed workload W' by evaluating the distance function for pairs of statements to produce a compressed workload having fewer statements than the initial workload W.

One aspect of the process is establishing a limit A on a loss in quality between use of the application with the compressed workload when compared with use of the application with the initial workload W. This limit can be used to determine when the workload compression is completed and provides an analytical assessment of the compression.

The workload compression can be implemented by choosing statements to remove from the workload W based on an all-pairs greedy search using the distance function and wherein removal of additional statements from the workload is ended when such removal results in a loss of quality that exceeds the limit Δ. An alternate statement selection process is based on clustering of statements and results in clustering until the loss in quality limit is exceeded by the compressed workload.

These and other objects, advantages and features of the invention will become better understood by reference to the

EXEMPLARY EMBODIMENT FOR PRACTICING THE INVENTION

Figure 2:
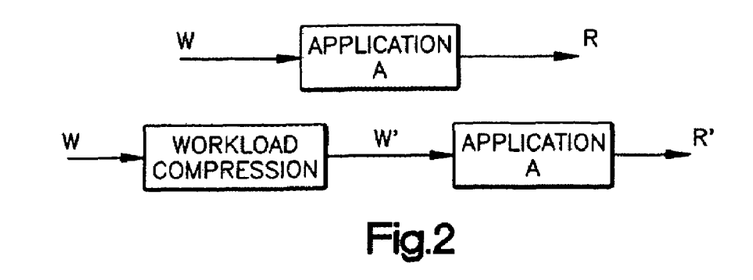
FIG. 2 is a depiction of an application working on both an uncompressed and a compressed database workload.

The exemplary embodiment of the invention concerns a system for compressing a workload that includes a number of statements. One example of a workload is a set of SQL DML statements. Thus, a workload $W=\{q_1, \ldots q_i, \ldots\}$ where $q_i$ is a SQL DML statement (i.e., SELECT, UPDATE, INSERT, DELETE). One can associate a weight w (a real number) with statement $q_i$. Workload compression is a technique for improving the scalability of an application A that consumes a workload W as input and produces a result R (FIG. 2). Instead of passing W as input to the application, one goal of the invention is use of a workload compression module 110 to first perform workload compression on W to obtain a compressed workload W', and then pass W' as input to the application A, thereby obtaining result R'. Such use of workload compression is meaningful if the following two criteria hold:

Efficiency Criterion:

The total running time, i.e., time taken for workload compression as well as the running time of the application, is less than the running time of the application on the original workload. This condition imposes the requirements that the workload compression algorithm itself is efficient and that it finds a compressed workload W' such that the running time of the application on W' is less than the running time of the application on W.

Quality criterion:

Informally, the quality condition requires that the quality of the result R' is "close enough" to the quality of the result R. More formally, let A be an application and $F_A$ be a function that quantitatively evaluates the result of the application with respect to the given workload W, i.e., $F_A(W,R)$ returns a real number that measures the quality of result R. Then this condition ensures that values $F_A(W,R)$ and $F_A(W, R')$ are close enough. Note that the exact definition of the function $F_A$ is application dependent.

A generalized workload compression problem can be stated as:

Let A be an application that takes as input a workload W and produces a result R. Let $F_A(W,R)$ be a function that quantitatively evaluates R with respect to W. Given $\delta$, $0<\delta<1$, find the workload W'that minimizes the total running time of the application A (including the time for finding W'), subject to the quality constraint: $|F_A(W,R)-F_A(W,R')|/|F_A(W,R)|<\delta$, where R' is the result produced by running A on input W'.

Note, that in the above formulation, W' need not be a subset of W, i.e., W' may contain statements not present in W. Workload compression can be applied in the context of multiple applications that consume a workload as input. Two such applications are explained in the two examples and for each example, a result R is produced by the application and an evaluation function F quantitatively evaluates this result.

EXAMPLE 1

Workload Compression for Index Selection

Selecting the right set of indexes is important for the performance of a database system. Automatically selecting appropriate indexes for a database is an important task since it reduces the burden on database administrators, and hence the total cost of managing the database. Recently, several major commercial database systems have developed tools to automate the task of choosing indexes. An index selection tool takes as input a workload W and a database, and produces as an output R a set of indexes appropriate for the given workload. To evaluate the quality of the result R, these tools typically use as $F_A(W,R)$ (where A=index selection), the query optimizer estimated execution time of statements in W if the result R is implemented (i.e., if the set of indexes R is materialized in the database). Thus, e.g., specifying $\delta=0.05$ for index selection implies that if one is compressing the workload an acceptable compressed workload W' provides an optimizer estimated execution time of statements in W when R' is implemented cannot deviate by more than 5% compared to the optimizer estimated execution time if R had been implemented.

EXAMPLE 2

Workload Compression for Approximate Answering of Aggregation Queries

The goal of approximate query processing (AQP) is to allow efficient but approximate answers to ad-hoc queries against large relational databases. Random sampling is an approach for approximately answering aggregation queries (e.g., queries computing SUM or COUNT aggregate expressions). In this approach, the query is executed on a sample of the data rather of the entire data, thereby returning approximate answers but speeding up the query significantly. Recently, several printed publications have recognized the importance of using workload information to pick samples of the data and thereby improve upon the straightforward approach of uniform random sampling. Thus, the workload W is analyzed in a preprocessing step and this information is used to produce as result R, an appropriate set of samples of one or more tables in the database. These samples are chosen with the objective of minimizing the average relative error in answering queries in W over the sample. The preprocessing step described above can be expensive if the workload W is large, and is therefore a suitable application for workload compression. For example, in the stratified sampling approach using a weighted sampling technique, this preprocessing step requires executing the queries in W. A commonly used definition of $F_A$ is the average relative error over all queries in W when answered using the samples. Thus, specifying $\delta=0.1$, for example, implies that an acceptable compressed workload W' produces a sample over which the average relative error of queries in W cannot deviate by more than 10% compared to the case when we choose the sample based on the original workload W.

Simplifying Assumptions

While the problem is general, it may not be amenable to efficient solutions for two reasons. First, statements in the compressed workload W' need not be a subset of the statements in W. Thus, the space of possible statements that need to be considered during workload compression is potentially much larger. The second reason that makes it hard to solve the general problem efficiently is that exact verification of the constraint on the loss of quality, $|F_A(W,R)-F_A(W,R')|/|F_A(W,R)|<\delta$ is expensive, since computing $F_A$ requires running the application A itself.

Figure 3:
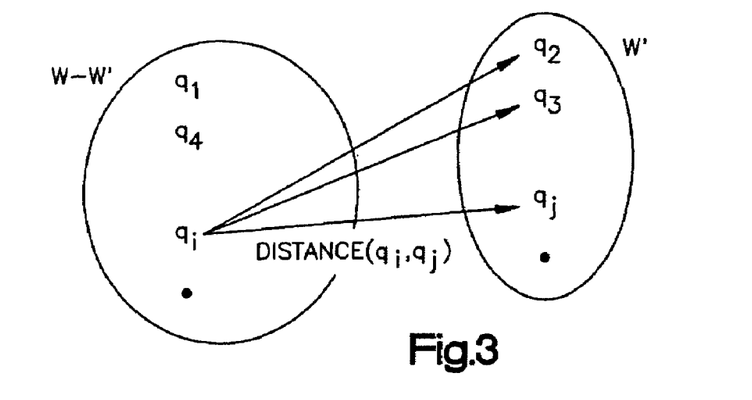
FIG. 3 is a visualization of a workload compression criteria involving the calculation of distances between queries.

The exemplary embodiment of the invention sacrifices some generality, but is more amenable to efficient solutions. In particular, the exemplary embodiment applies the following two criteria: (1) The compressed workload W' is a subset of the original workload W. and (2) The quality constraint is defined in terms of "distances" between pairs of statements in the workload. The exemplary embodiment uses an application specific Distance function between any pair of statements in the workload. Distance$_A$ ($q_i$, $q_j$) estimates the loss in quality of the result of application A for statement $q_i$ if $q_i$ is discarded, but statement $q_j$ is present in the compressed workload—independent of the other statements in the workload. More precisely, if $R_i$ is the result of the application when the workload used is $\{q_i\}$ and $R_j$ is the result of the application when the workload used is $\{q_j\}$, then $\forall q_i, q_j \in W$ Distance$_A$ ($q_i$, $q_j$) estimates the quantity $F_A(\{q_i\}, R_j)-F_A(\{q_i\}, R_i)$. Operation of the distance function is visualized with regard to FIG. 3. In FIG. 3 one sees that W' is the compressed workload and W-W' is the set of statements in W that have been discarded by workload compression. For each statement $q_i \in W-W'$, we can find the "closest" statement in W' as determined by the Distance function. The exemplary embodiment finds the smallest W' such that if one takes a weighted sum of the distances between each discarded statement and the retained statement closest to it, that sum should not exceed a pre-specified value.

The formal revised definition of the problem:

Let A be an application that takes as input a workload W. Let Distance$_A$ ($q_i$, $q_j$) be a distance function for application A that $\forall q_i, q_j \in W$, the distance function returns an estimate of the loss in quality for statement $q_i$ if it is discarded but $q_j$ is retained in the compressed workload. Given $\Delta$, which is the limit on the maximum allowable loss in quality, find the smallest workload W'$\subseteq$W, such that $\Sigma_{q_i \in W-W'}\min_{q_j \in W'} \{w_i \cdot$Distance$_A$ ($q_i$, $q_j$)$\}<\Delta$. This means that a summation of the result of the operation of the distance function between all the discarded queries in the workload and the next closest query is less than a specified constant $\Delta$.

Observe that unlike the general compression problem where the constraint on quality $\delta$ is relative, $\Delta$ is specified in absolute terms and has the same units as the Distance function. Also note that variations are possible by replacing the min in the quality constraint with other functions such as max or average. For example, using max makes the worst-case assumption that loss in quality for $q_i$ could be as large as the distance to the "furthest" statement from it in the compressed workload. Thus, if max is used, one would expect less degradation in the quality of the application, but also less compression of the workload since one presumably more rapidly reaches the threshold criteria. The exemplary process for compression of the workload disclosed herein makes no assumptions about properties of the Distance function. For example, it does not require that the Distance function be symmetric or obey the triangle inequality. In fact, the very definition of Distance$_A$ ($q_i$, $q_j$) is asymmetric, since it measures the distance with respect to $\{q_i\}$, the discarded query. This generality is important since for the specific examples of workload compression results indicate these properties were not satisfied. As shown below, the distance based workload compression problem is provably hard when the Distance function can return arbitrary values. It is emphasized that the exact definition of Distance ($q_i$, $q_j$) is application dependent since it must capture the impact on quality of the result produced by the application when $q_i$ is discarded and statement $q_j$ is retained in the compressed workload. Table 1 (below) summarizes the distance-based workload compression problem for the two applications of workload compression described previously.

TABLE 1

| Application | Meaning of Distance($q_i$, $q_j$) | Meaning of $\Delta$ |
| --- | --- | --- |
| Index Selection | Estimated increase in the cost of executing statement $q_i$ if it is discarded but $q_j$ is retained | Maximum allowable increase in (estimated) running time of the workload W |
| Approximate Answering of Aggregation Queries | Increase in the relative error of answering query $q_i$, if $q_i$ is discarded but $q_j$ is retained | Maximum allowable increase in average relative error of queries in W |

The problem of a distance based compression that was defined previously aims to minimize the size of the set W', so the constraint $\Sigma_{q_i \in W-W'}\min_{q_j \in W'} \{w_i \cdot$Distance ($q_i$, $q_j$)$\}<\Delta$ is satisfied. When the Distance function can generate arbitrary values, the solution is NP-Hard. The exemplary embodiment uses a reduction from the decision version of the Minimum k-Median problem which is known to be NP-Complete. To show this, first define the decision problem of the Minimum k-Median problem:

Problem Minimum k-Median: Given a complete graph G (V, E), costs C(u,v)$\in$N (the set of natural numbers), $\forall$u, v$\in$V, an integer k, and a number s. Does there exist a set of medians V'$\subseteq$V of size k such that the sum of the distances from each vertex to its nearest median is less than s, i.e., $\Sigma_{u \in V-V'}\min_{v \in V'} \{C(u,v)\}<s$?

Lemma 1. The problem of distance based workload compression is NP-Hard if the Distance function can return arbitrary values.

Proof: The decision problem for distance based compression is as follows: Let A be an application that takes as input a workload W. Let Distance ($q_i$, $q_j$) be a function that quantifies the distance between any pair of statements $q_i$, $q_j \in W$. Given an integer k, and a number $\Delta$, does there exist a workload W'$\subseteq$W of size k such that $\Sigma_{q_i \in W-W'}\min_{q_j \in W'}$ (Distance ($q_i$, $q_j$))$<\Delta$.!

There is a direct correspondence of the two problems as follows: V$\Leftrightarrow$W, V'$\Leftrightarrow$W', k$\Leftrightarrow$k, Cost$\Leftrightarrow$Distance, and s$\Leftrightarrow\Delta$. Hence, the decision problem of distance based compression is NP-Complete. Therefore it is NP-Hard.

Although for metric spaces there exist constant factor approximation algorithms for the Minimum k-Median problem, it has been shown that the Minimum k-Median problem with arbitrary costs does not have a constant factor approximation algorithm.

Overview of Exemplary embodiment

Figure 4:
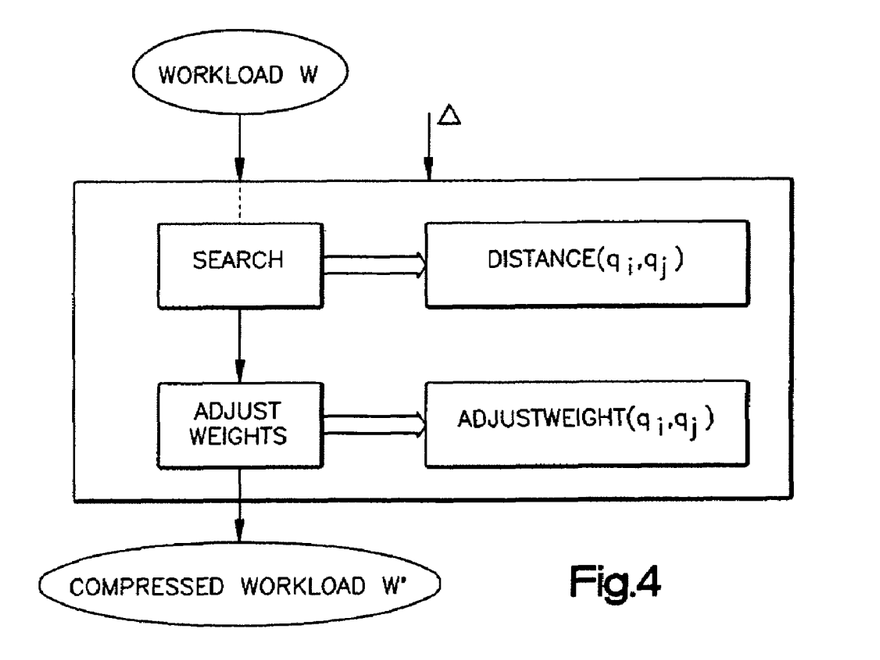
FIG. 4 is a block diagram showing components for compressing a workload W to produce a compressed workload W' in accordance with an exemplary embodiment of the invention.

An overview of an architecture of software components for implementing an exemplary embodiment of the invention is shown in FIG. 4. The input to the workload compression module 110 is a workload W and a constraint Δ, and an output is a compressed workload W'. An important part of the system is a Search module 112 (described below) that finds the compressed workload W'. The exemplary embodiment finds the smallest (cardinality) subset of the given workload W that satisfies the given constraint. For this optimization problem, two alternative processes are disclosed (besides random sampling). As described earlier, the search process consults a Distance function module 114 (described below), but makes no assumptions about properties of the Distance function—in other words the Distance function module 114 can return arbitrary values. The Distance function serves as the basis for estimating the loss in quality due to workload compression and is application specific. The quality of the compressed workload depends on the accuracy and efficiency of the Distance function. Efficiency in computing the Distance function is important since the distance function may be invoked many times for a large workload by the Search component. The accuracy of the Distance function is also important since overestimation of the loss in quality achieves less compression of the workload than ideally possible, whereas underestimation can cause an unacceptable result when the compressed workload is used by the application. An example of how to make this trade-off of efficiency vs. accuracy is presented in designing the Distance functions for each of the two applications: index selection and Aggregation query processing.

The exemplary process can associate a weight $w_i$ with each statement $q_i$ in the workload, which reflects the relative importance of that statement. The weight of a statement can significantly influence the result of the application. For example in index selection, the higher the weight of a statement, the more likely it is that the indexes that are suitable for that statement are part of the final result. When a statement is discarded by workload compression, one approach is to add the weight of the discarded statement to statement that is the "closest" to the discarded statement (as defined by the Distance function) in the compressed workload. However, as illustrated by the following example for index selection, simply adding the weight can be inappropriate.

EXAMPLE 3

Problem with Simple Addition of Weights

Consider a workload W with the following three queries:
$Q_1$: SELECT*FROM persons WHERE age<10.
$Q_2$: SELECT*FROM persons WHERE age<20.
$Q_3$: SELECT*FROM persons WHERE income<20000

Assume the weights of these queries in W are all 1. Suppose the compressed workload is $\{Q_2, Q_3\}$. Using the obvious solution, since $Q_2$ is the closest retained query to $Q_1$, the adjusted weights of these queries is 2 and 1 respectively. However, from the queries, one sees that the presence of an index on column age would result in more benefit for $Q_1$ as compared to $Q_2$. Thus, the compressed workload has been biased against selecting an index on column age.

The exemplary embodiment includes a post-processing step, wherein an Adjust Weights module 120 (described below) uses an application specific AdjustWeight $(q_i,q_j)$ function module 122 to adjust the weight of each statement in the compressed workload. Note that for certain applications, the solution of simply adding weights to the nearest retained statement may be appropriate. Finally, as an alternative embodiment the adjustment of weights during the search step is used to compress the workload.

A search component is responsible for finding a subset of W of smallest cardinality satisfying the constraint that the loss in quality is less than the given Δ. Disclosed herein are two alternative search processes for solving distance based workload compression. A first search process is based on the K-Mediod clustering process and the second is a new greedy search process. A comparison of these two search processes is provided below.

Based on the hardness result above it would be unexpected to achieve a polynomial time algorithm that computes an optimal solution to the distance based compression problem when the Distance function can return arbitrary values. The solutions to the distance based compression leverages efficient heuristic search algorithms. It is noted, however, that for specific Distance functions, the distance based compression may be solvable in polynomial time, and alternative search algorithms customized for a particular application may be appropriate.

K-Mediod Procedure

The Minimum k-Median problem is a clustering problem. The first search process adapts the K-Mediod clustering process. See Han, J., and Kamber M. *Data Mining: Concepts and Techniques*. Morgan Kaufmann Publishers, 2001. This process is a building block for constructing an algorithm for distance based compression by performing binary search on the size of the workload W. The pseudo code for this search process (Listing 1) that calls a modified K-Mediod based search process (Listing 2) are presented below.

---
Listing 1

Input: Workload W, Constraint Δ
Output: Compressed workload W'
  1. Let Min_k = 0, Max_k = |W|, W' = W
  2. While (Min_k ≦ Max_k)
  3. k = (Min_k + Max_k)/2
  4.   Let WTemp = KMED(W, k)
  5. Let D be the weighted sum of distances from each statement in W to the closest statement in WTemp as determined by the Distance function.
  6.   If D ≦ Δ, W' = WTemp, Max_k = k − 1
  7.     Else Min_k = k + 1
  8.   End If
  9. End While
 10. Return W'

---

Listing 2

Input: Workload W, k
Output: Workload W' of size k
1 Pick k statements $s_1 \ldots s_k$ from W at random. Each statement chosen forms the "seed" of a cluster.
2. For each statement e ∈ W, assign it to the cluster that contains the seed closest to e, as determined by the Distance function.
3. For each cluster C, re-compute the seed for that cluster as the "median" statement within the cluster, i.e., the statement e ∈ C such that $\Sigma_{v \in C}$ Distance (v, e) is the smallest.
4. Repeat steps 2-3 until convergence, i.e., until the same clusters are obtained in some two iterations.

---

It can be shown that the process of listing 2 will terminate in a finite number of iterations of Steps 2-3. Also, the solution obtained by this process is (at least) a local optimum. The running time of distance based compression of the workload depends primarily on the number of invocations of the Distance function. As one can see from the pseudo code, the process of listing 2 performs $O((|W|-k)*k+k*(|W|/k)^2)$ invocations of the Distance function assuming each cluster on average contains the same number of statements. Note that since the process of listing 1 performs a binary search over the range $0 \ldots |W|$, it invokes KMED at most $\log_2|W|$ times. WC-KMED produces a solution that is a local optimum.

All-Pairs Greedy Search Process

The process outlined in listings 1 and 2 does not invoke the Distance function on every pair of statements in W. An alternate ALL-PAIRS process does look at the Distance of each pair of statements in the workload. The goal in using this ALL-PAIRS process is to determine how the computing of all Distances would impact the quality of workload compression. Once the pair-wise distances are computed, the ALL-PAIRS process adopts a greedy approach that discards the next "best" statement from W until it is unable to discard any more statements without violating the given constraint $\Delta$. The pseudocode is given in Listing 3.

The process of ALL-PAIRS performs $O(|W|^2)$ computations of the Distance function since in the first execution of Step 4 all pair-wise invocations of Distance are performed. Thus, it is expected the process outlined in Listings 1 and 2 will scale better with workload size compared to the ALL-PAIRS process. Also, unlike the process of listing 1 and 2, the ALL-PAIRS process cannot guarantee that the solution obtained is a local optimum for the distance based workload compression problem.

While the process of listings 1 and 2 is based on a known algorithm for solving the k-Median problem, in testing it was found that the process of listing 3 often achieves more compression for distance based workload compression. Intuitively, the process of listing 3 performs better when the workload has many small clusters and the intra-cluster distances are small relative to inter-cluster distances.

Random Sampling

An alternative technique for improving the scalability of an application that consumes a workload W is to use sampling to select a subset W' of W. The simplest of these schemes is uniform random sampling, where each statement in W has an equal probability of being selected. However, this it is believed this approach can result in poor quality

---

Listing 3

---

Input: Workload W, Constraint $\Delta$
Output: Compressed workload W'
1.  Let the sets Candidates = W, Keep = { }, Prune = { }
2.  Let Total-Dist = 0
3.  While (Total-Dist < $\Delta$)
4.     For each statement $q_i \in$ Candidates, compute $d_i = \min_{(i \neq j, q_j \in Candidates \cup Keep)} (w_i \cdot Distance(q_i, q_j))$
5.     Let $q_{min}$ be the statement with the minimum distance
        $d_{min}$ computed in Step 4.
6.     If ($d_{min}$ + Total-Dist < $\Delta$)
           Move $q_{min}$ from Candidates to Prune
           Old-Dist = Total-Dist
           Total-Dist = $\Sigma_i \min_k (w_i \cdot Distance(q_i, q_k))$ where
              $q_i \in$ Prune and $q_k \in$ Candidates $\cup$ Keep
           If (Total-Dist > $\Delta$)
              Move $q_{min}$ from Prune to Keep,
              Total-Dist = Old-Dist
           EndIf
7.     Else Break
8.     EndIf
9.  End While
Return W' = Candidates $\cup$ Keep

---

At each step the process of listing 3 maintains three sets, Keep, Prune and Candidates. Keep consists of statements which are definitely going to be retained in the compressed workload W'. Prune consists of the statements which are currently not in W' and Candidates consists of the statements whose outcome hasn't yet been decided. In each iteration of the While loop in Step 3, for each statement in Candidates, the process computes the distance to the closest statement (as defined by the Distance function) that hasn't been pruned (Step 4). The statement for which this value is the smallest (Step 5) is considered next for pruning. Prior to actually pruning this statement however, the process verifies that removal of this statement does not violate the constraint $\Delta$, since this statement may have been the closest statement to one or more statements that had been pruned previously. This check is performed in Step 6. At the end of the process, the statements in the sets Candidates and Keep constitute the compressed workload W'.

workload compression due to the following problems: (a) Uniform sampling ignores valuable information about statements in the workload and therefore misses opportunity for more compression. (b) When the sampling fraction is small, certain small "clusters" of important statements may be altogether discarded and never make it into the compressed workload. This follows from a well known statistical result. Testing of the invention used a stratified sampling based process, which partitions the workload into strata and then samples uniformly within each stratum. One issue with applying sampling is how much (i.e., what fraction of W) to sample? The process starts with a sampling fraction $f_0$ and verify if the constraint $\Delta$ is satisfied for that sample—note that this step requires invoking the Distance function. If the constraint is not satisfied, the process by increasing the sampling fraction by a factor m>1 and sampling an additional set of statements. The process terminates when it find a sample that satisfies the constraint.

Distance Function

As described above, an important component of the distance based workload compression is the computation of Distance ($q_i$, $q_j$) for any pair of statements $q_i$, $q_j$ in the given workload W. Recall that the function Distance ($q_i$, $q_j$) measures the expected loss in quality of the result of the application on workload {$q_i$} if the workload {$q_j$} is provided as input to the application. A judicious trade-off between accurate and efficient computation of the Distance function is important for ensuring the success of workload compression. Accuracy is important since overestimation of Distance ($q_i$, $q_j$) results in less workload compression than possible, while underestimation of Distance ($q_i$, $q_j$) can result in poor quality of the result of the application when the compressed workload is used. Efficiency of computing Distance is important since the search algorithms for workload compression may need to invoke the Distance function many times for different pairs of statements.

An exact method for computing Distance ($q_i$, $q_j$) is: (i) run the application on workload {$q_i$} and compute the quality of the result for {$q_i$}, (ii) run the application on {$q_j$} and compute the quality of the result for {$q_i$} and (iii) take the difference in quality between Steps (i) and (ii). However, for most applications such a method is inefficient since it requires running the application, and hence negates the very purpose of workload compression. Thus, the challenge of developing an appropriate Distance function for an application is to estimate this loss in quality efficiently. Two guidelines are followed in developing Distance functions for the two applications described herein: index selection and approximate answering of aggregation queries (AQP). These guidelines are broadly applicable in the context of other applications as well.

The first guideline is driven by the requirement that the computation of Distance function be efficient. A core set of information about each statement in the workload is identified that can be derived with low overhead and this information is relied upon for computing Distance. For example, in the exemplary implementation of a distance function for both applications, the distance function uses information that can be derived from the SQL parser and a selectivity estimation module. This information includes: (a) Type of the statement, (SELECT, INSERT, UPDATE, DELETE) (b) Structure of the query, e.g., tables referenced, projection columns, selection and join predicates etc. (c) For selection predicates, the selectivity of the predicate (computed by using a selectivity estimation module based on available statistics in the database) (d) If available, the (estimated) cost of executing the statement. This cost information can be obtained either via one invocation of the query optimizer (e.g., in Microsoft SQL Server using the Showplan interface, or in IBM DB2 using the EXPLAIN mode) or from previously recorded information about the actual execution time of the statement.

A second guideline is to leverage the technique of logically partitioning the workload. The idea is that for any two queries $q_i$, $q_j$ belonging to different partitions, Distance($q_i$, $q_j$) between the two queries is ∞. Partitioning can be incorporated within the Distance ($q_i$, $q_j$) function by generating a "signature" for each statement and returning ∞ if the two signatures are not identical. Thus, each statement with a distinct signature belongs to a different logical partition. As a simple example, in the index selection application, when two statements reference disjoint sets of tables, it is reasonable to separate them into different partitions since indexes that are useful for one statement cannot be useful for the other. There are two benefits of partitioning the workload. First, it provides a way to ensure that at least a minimum number of statements (i.e., at least one statement per partition) will be retained in the compressed workload. Second, since the signature of a query can typically be computed very efficiently compared to the more careful analysis that goes into the rest of the Distance function, partitioning serves as a "shortcut" that reduces the computational overhead of invoking the Distance function. Finally, note that the signature to be used to partition the workload is application dependent, and is therefore incorporated into the Distance function.

Distance Function for Index Selection

Assume that the workload W consists of SELECT, INSERT, UPDATE, DELETE statements, where the SELECT statements are limited to single-block Select, Project, Join (SPJ) queries with Group-By, Aggregation and Order-By. The Distance function for queries (i.e., SELECT statements) is discussed first. For index selection, the Distance ($q_i$, $q_j$) function measures the expected loss of benefit for {$q_i$} if the set of indexes recommended for {$q_j$} were used to answer the query instead of the set of indexes recommended for {$q_i$} itself. Our goal is to estimate this expected loss of benefit efficiently without actually invoking the index selection application. While more sophisticated Distance functions could be designed for index selection, we believe that the disclosed process captures essential aspects of index selection, without making assumptions about the specific process used by the index selection tool. This is backed by our test results (below) which show the effectiveness of the exemplary Distance function for index selection tools on two different commercial database systems.

Partitioning the Workload

A first step in the exemplary Distance function is to detect if the two queries belong to the same partition. If they do not, the distance function returns with a value of ∞. As mentioned above, the intuition behind partitioning is to logically place queries that are "far apart" into disjoint partitions. In the context of index selection, two queries can be considered far apart, if there is little or no overlap in the set of indexes that would be chosen for each query. Based on this intuition we partition the workload on the basis of the tables accessed in each query and the join predicates (if any). This is done by generating a signature for each query that consists of the table IDs referenced in the query and (table, column) IDs accessed in the join predicate.

EXAMPLE 4

Motivating Example for Selectivity Based Partitioning

Consider the following two queries:
$Q_1$: SELECT*from persons where age>80
$Q_2$: SELECT*from persons where age>1

As example 4 shows, the straightforward partitioning scheme outlined above may still include queries into the same partition that are still "far apart". According to the above scheme, both $Q_1$ and $Q_2$ will be assigned to the same partition because they both have the same signature. However, note that the queries are still far apart from the point of view of indexes that are appropriate for each query. Due to the respective selectivities of the predicates on age, for $Q_1$, an index on column age is likely to be very useful, whereas for $Q_2$ an index on column age is likely to be of no use.

Motivated by this observation, the process further splits each partition on the basis of selectivity information. For a single-table query, it computes the joint selectivity of all the predicates. All queries with joint selectivity less than or equal to a predetermined selectivity $s_0$ (we used a value of $s_0=0.1$) are assigned to one partition, and those with selectivity exceeding $s_0$ are assigned to a different partition. Thus, for single-table queries, the process can generate at most two partitions. The process uses the extension of this partitioning scheme to the case of multi-table queries. Under this scheme, all queries belong to a t-table partition (i.e., a partition with queries accessing those t tables) get split into at most $2^t$ partitions (some of which may be empty). Although the number of such partitions can, in principle, become large, experience indicates that over a variety of large workloads (real and synthetic), the number of partitions grew very slowly with the number of tables.

Quantifying Distance

The disclosed approach for computing the Distance function is based on the observation that the effectiveness of an index for a query can be broadly categorized into one or more of the following performance categories: (a) Reduces the number of rows that need to be scanned from the table, (b) Eliminates the need to access the table altogether since the index contains all columns required to answer the query (i.e., the index is "covering" for the query) or (c) Reduces/eliminates the cost of sorting for an operator in the query. When computing a distance $(q_i, q_j)$ the process evaluates each query and classifies the columns referenced in the query as: (1) Selection columns—contains all columns that occur in selection conditions. Indexes on these columns fall into performance category (a) above. (2) Required Columns—contains all columns that were referenced in any part of the query (including projection columns). Indexes on these columns fall into performance category (b) above. (3) Group-By Columns—contains all columns that occur in the GROUP BY clause of the query. (4) Order-By Columns—contains all columns that occur in the ORDER BY clause of the query. Indexes on columns in Category (3) and (4) fall into performance category (c) above.

The process then computes four functions Dist-Sel $(q_i, q_j)$, Dist-Reqd $(q_i, q_j)$, Dist-GB $(q_i, q_j)$ and Dist-OB $(q_i, q_j)$. Each of these functions captures the loss of benefit for a particular performance category. For example, Dist-Sel computes a distance by examining only the columns in the Selection category of the queries $q_i$ and $q_j$, and thereby tries to capture the difference in performance category (a). Once each of the functions is computed the exemplary process defines Distance $(q_i, q_j)$ as the maximum of the four values. Intuitively, by considering the maximum value, the process adopts a conservative approach that considers two queries as "close" only if they are "close" in each of these categories.

Computing Dist-Sel: The approach is based on the intuition that the column (or sequence of columns) in the predicate with the lowest selectivity (low selectivity means a predicate that selects few records from the table) is the one that will be picked to be indexed by the index selection tool for that query. In other words, while considering 1-column indexes, the process assumes that the column with the smallest selectivity will be picked. On the other hand, when considering 2-column indexes, it assumes that it is the sequence of two columns with the two lowest selectivities that will be picked. The following example illustrates how Dist-Sel($q_i$, $q_j$), is computed.

|       | $c_1$ | $c_2$ | $c_3$ |
|-------|-------|-------|-------|
| $Q_1$ | 0.1   | 0.3   | 0.2   |
| $Q_2$ | 0.5   | 0.2   | 0.4   |

EXAMPLE 5

Computing Dist-Sel: Suppose one has two queries $Q_1$ and $Q_2$ referencing a single table T, with predicates on columns $c_1$, $c_2$, $c_3$. The selectivities of these predicates are given by the adjoining table. The best 1-column index for $Q_1$ is $I_1=(c_1)$. On the other hand, the best 1-column index for $Q_2$ is $I_2=(c_2)$. The loss of benefit for $Q_1$ if $Q_1$ is pruned and query $Q_2$ is retained, is given by difference of cost between evaluating $Q_1$ in the presence of $I_2$ and cost of evaluating $Q_1$ in presence of $I_1$, which is given by (0.3–0.1)*Cost ($\{Q_1\}$, $\{\}$)=0.2*Cost ($\{Q_1\}$, $\{\}$). (Note that Cost ($\{Q_1\}$, $\{\}$) corresponds to a scan of the entire table i.e., no indexes are present). The intuition is that the presence of index $I_2$ would require scanning 30% of the base relation for answering $Q_1$, whereas the presence of index $I_1$ would require scanning only 10% of it. Examining 2-column indexes, one sees that the best 2-column index for $Q_2$ is ($c_2$, $c_3$) and the best 2-column index for $Q_1$ is ($c_1$, $c_3$). Therefore, the loss of benefit is given by (0.3*0.2–0.1*0.2*Cost ($\{Q_1\}$, $\{\}$)=0.04*Cost ($\{Q_1\}$, $\{\}$). Similarly, for 3-column indexes, one sees that the loss of benefit is 0. In general, this analysis can similarly be extended for up to p-column indexes. The process takes Dist-Sel ($Q_1$, $Q_2$) as the maximum of the numbers computed—in the example, 0.2*Cost ($\{Q_1\}$, $\{\}$).

Note that in case of multi-table queries, the process perform the same analysis as in the above example on a per table basis and then takes a weighted average of the table-wise Dist-Sel ($q_i$, $q_j$) values, the weight being the size of the table in pages. The process uses the size of the table as weight because for the same selectivity value, the amount of I/O required to answer the query is proportional to the size of the table.

Computing Dist-Reqd: Dist-Reqd($q_i$, $q_j$) tries to capture the loss of benefit for performance category (b), i.e., use of covering indexes. The intuition behind the scheme is presented for single-table queries. The extension for the multi-table case is similar to the extension for Dist-Sel. Intuitively, if $q_i$ is pruned away, and the required columns of $q_i$ are a subset of the required columns of $q_j$, then the covering index for $q_j$ can be used to answer $q_i$ and hence Dist-Reqd ($q_i$, $q_j$) is relatively small. However, if the required columns of $q_i$ are not a subset of the required columns of $q_j$, then the covering index chosen for $q_j$ will not be useful for answering $q_i$ Pruning away $q_i$ in this case requires scanning the entire table for answering $q_i$, and therefore the loss of benefit (i.e., Dist-Reqd) is large.

Computing Dist-GB & Dist-OB: First consider Dist-OB ($q_i$, $q_j$). The process assumes the model of no partial sort benefits, i.e., an index ($c_1$, $c_2$, $c_3$) is of no use in answering a query with ORDER BY $c_1$, $c_3$, $c_2$, even though there is some overlap in the prefix of the index and the prefix of the order-by clause. Under this simplifying assumption, Dist-OB ($q_i$, $q_j$) is 0 if the ORDER BY clause of $q_i$ is a leading prefix of the ORDER BY clause of $q_j$. Otherwise Dist-OB ($q_i$, $q_j$) is equal to the Cost ($\{q_i\}$, $\{\}$). Computation of Dist-GB ($q_i$, $q_j$) is done similarly, except that the process requires that the group-by columns of $q_i$ to be a subset (rather than a leading prefix) of the group-by columns of $q_j$ in order for the index chosen for $q_j$ to be applicable to $q_i$.

Extensions for updates: If both statements are "pure" updates, e.g., of the form INSERT INTO $T_1$ VALUES ( . . . ), then the process sets the Distance between such statements to 0, since one statement can be safely pruned against the other without any impact on choice of indexes so long as the weight of the pruned statement is added to the weight of the retained statement. However, in general, an UPDATE/INSERT/DELETE statement can have an "update" part and a "query" part: e.g., INSERT INTO $T_1$ SELECT*from $T_2$ WHERE <condition>. Such a statement s can be viewed as (q,u) where q is the query part and u is the update part. In this case, the process defines Distance ($s_i$, $s_j$) between two such statements as Distance ($q_i$, $q_j$) only if AdjustWeight($q_i$, $q_j$) is (approximately) equal to AdjustWeight($u_i$, $u_j$) (see below for the definition of the AdjustWeight function), and ∞ otherwise. The reason for this is that otherwise the process would be biasing the compressed workload either towards the query part or towards the update part.

Properties of the Distance Function

As noted above, properties of the Distance function such as symmetry or triangle inequality can save a (potentially significant) number of explicit computations of the function. From the definition of the above Distance function, it is clear that it does not obey symmetry, i.e., Distance ($q_i$, $q_j$)≠Distance ($q_j$, $q_i$). It is also easy to construct examples that show that the triangle inequality doesn't hold true for this distance metric, i.e., Distance ($q_i$, $q_j$)+Distance ($q_j$, $q_k$) is not necessarily greater than Distance ($q_i$, $q_k$) However, the disclosed Distance function for index selection (defined above) satisfies the following property. For the Distance function defined in above, if Distance ($q_i$, $q_j$)=Distance ($q_j$, $q_i$)=0, then $\forall q_k$, Distance ($q_k$, $q_i$)=Distance ($q_k$, $q_j$).

The process can exploit the above property to refine the query signature used in partitioning and hence reduce the work done when the Distance function is invoked. In testing over real as well as synthetic workloads, it was found that this optimization saved anywhere between 10%-40% of the Distance computation overhead.

Distance Function for Approximate Answering of Aggregation Queries

For an overview of the AQP application, refer to Example 2 above. As explained in the example, the preprocessing step consumes a workload W and produces as output samples of one or more tables in the database. We assume that the workload consists of aggregation queries containing the COUNT/SUM aggregates possibly with selections, GROUP BY and foreign-key joins. The preprocessing step chooses the sample so as to minimize the average relative error of answering queries in W over the sample as compared to answering the queries on the full table. Note that for GROUP BY queries the relative error is averaged over all groups of the query—missing groups are assigned a relative error of 1.

Distance ($q_i$, $q_j$) for AQP attempts to estimate the relative error in answering $q_i$ if it is pruned but $q_j$ is part of the compressed workload. As with the Distance function for index selection, we leverage the idea of partitioning and return ∞ if $q_i$ and $q_j$ have different signatures. The signature of a query is defined by the subset of tables referenced in the query. If both queries belong to the same partition, they are analyzed based on whether they have selections or GROUP-BY. If both queries are pure selection queries, i.e., do not contain GROUP BY, then the distance function Distance ($q_i$, $q_j$) is defined as the fraction of records selected by $q_i$ that are not selected by $q_j$. The intuition behind this definition is that the error in answering a pure selection query $q_i$ depends on the number of records in the sample that are selected by $q_i$. If $q_j$ is used to determine the sample, then the error for $q_i$ increases as the overlap of $q_i$ with $q_j$ decreases. Note that if the database engine supports the DIFFERENCE operator, then this function can be estimated by invoking the query optimizer. Otherwise, this metric must be estimated based on analysis of selection predicates and using selectivity estimates.

When one query is a pure selection query and the other is a GROUP BY query, the distance function Distance ($q_i$,$q_j$) =∞. When both queries have GROUP BY columns, Distance ($q_i$, $q_j$) is defined as follows. Let G be the set of grouping columns that occur in query $q_i$ and let G' be the set of grouping columns that occur in both $q_i$ and $q_j$. Let D(X) be the number of groups in a query (without selections) that contains exactly the grouping columns X. Then Distance ($q_i$, $q_j$)=1−D(G')/D(G). The intuition is that (i) the error for GROUP BY queries is dominated by missing groups, and (ii) the number of missing groups is likely to increase as the overlap between the grouping columns of $q_i$ and $q_j$ decreases.

Adjusting Weights

Recall that a workload is a set of statements where each statement has an associated weight $w_i$ (Section 2). The weight of a statement signifies the importance of the statement in the workload, and plays a role in determining the optimization function of the application. For example, index selection tools typically optimize a weighted function of the (estimated) execution cost of statements in the workload. Thus, an index that is useful for a query with large weight is more likely to be chosen by the tool. In order to prevent statements in the compressed workload from having unduly high or low weight relative to other statements, it is important that the weights of statements in the compressed workload be set appropriately.

In the exemplary architecture (see FIG. 4), this issue is addressed in the Adjust Weights software module 122 as follows. At the end of the search algorithm (see above), the exemplary process finds for every pruned statement $q_i$, the statement $q_j$ nearest to it in the compressed workload (in terms of the Distance function) and adjusts the weight of $q_j$. However, as illustrated by Example 3 (see above) a naïve approach of simply adding the weight of the pruned statement to the nearest retained statement can result in poor quality of the compressed workload. In the exemplary embodiment, an application specific AdjustWeight ($q_i$, $q_j$) function serves the purpose of specifying the amount by which the weight of a retained statement $q_j$ should be incremented if $q_i$ is pruned and $q_j$ is the closest statement to $q_i$.

An appropriate AdjustWeight function for the index selection problem is presented. If $q_i$ is pruned and its nearest statement is $q_j$, then the process sets the weight of $q_j$ in the compressed workload to $w_j + w_i * \alpha_{ij}/\alpha_{jj}$ where $\alpha_{ij}$ is the benefit that query $q_i$ gets from the indexes recommended for $q_j$. The scenario from Example 3 is revisited to illustrate how the approach solves the problem of biasing.

EXAMPLE 3

(Continued from Above): Suppose the benefits of an index on column age for $Q_1$ and $Q_2$ are 50 units and 40 units respectively. The actual total benefit from index on column age for W is 50*1+40*1=90 units, whereas for W', this benefit is 40*2=80 units. Therefore, as pointed out earlier, we have biased the workload away from picking an index on column age. Using the approach described above, the weight of $Q_2$ in the compressed workload would be $w_2'=w_2+w_1*\alpha_{12}/\alpha_{22}=1+1*50/40=2.25$. We can now easily verify that the benefit of the index on column age for the compressed workload is 2.25*40=90, which is same as the benefit for the original workload.

Finally, we note that for the AQP application, we use the default AdjustWeight $(q_i,q_j)$ function, which simply adds the weight of $q_i$ to $q_j$.

Computer System

Figure 1:
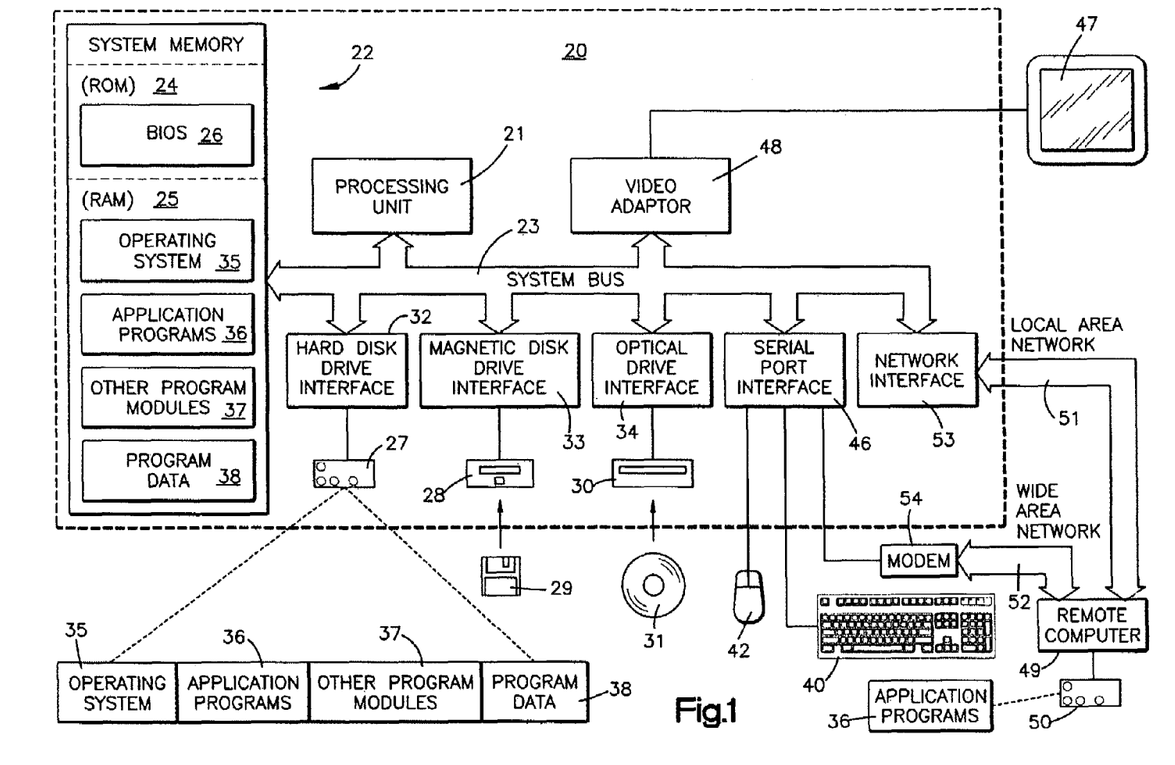
FIG. 1 is a schematic illustration of a computer system for use in practicing the present invention.

With reference to FIG. 1 an exemplary data processing system for practicing the disclosed invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Testing

Testing the exemplary embodiment shows that: (1) In the context of the Index Tuning Wizard for Microsoft SQL Server 2000, the disclosed Distance function for index selection produces significant compression of the workload while obeying the given quality constraint. (2) The same Distance function for index selection works well on another index selection tool, viz., IBM DB2's Index Advisor. (3) The clustering process of compressing the workload scales better than ALL-PAIRS workload compression but the latter can achieve significantly more compression. (4) The disclosed framework for workload compression can be applied to another application as well, viz. AQP, by providing an appropriate Distance function.

Testing was conducted on an x86 900 Mhz dual processor computer with 512 MB RAM and an internal 30 GB hard drive running Microsoft Windows 2000 Server. This system was used to test the disclosed workload compression on several databases and workloads, including real and synthetic schemas and workloads. The system was tested on two benchmark workloads (TPC-H and APB), two real workloads (Real-1 and Real-2) maintained by the assignee of the present invention, and several synthetic workloads. The database for Real-1 is about 600 MB and contains about 90% update statements, whereas Real-2 workload contains decision support queries against a 500 MB database. All the synthetic databases conform to the TPC-H schema and were generated using a synthetic data generation program. The size of the synthetic databases were 1 GB. The synthetic workloads were generated using a query generation program, which has the ability to vary a number of parameters including number of joins, number of group-by columns, number of order-by columns, number of selection conditions in a query, and percentage of update statements in the workload.

Evaluation Metrics: For the index selection application testing was evaluated using the following metrics to evaluate the workload compression solution: (a) Percentage of queries pruned by workload compression (b) Percentage reduction in total tuning time, i.e., sum of running time of index selection tool on the compressed workload and time spent in compressing the workload as compared to running the tool on the original workload. (c) Percentage loss in quality of the solution produced by the index selection application. The percentage change in the optimizer-estimated cost of the original workload as the metric of quality. This was obtained by running the index selection tool on both the original workload as well as the compressed workload, implementing the recommendations and calculating the optimizer estimated running time of the original workload for both the cases. In the testing, the constraint (A) on loss in quality was chosen to be 10% of the cost of the original workload W on the current database. For the AQP application, the testing measured loss in quality due to workload compression as the average relative error of queries in W when the entire workload is used in the preprocessing phase and the average relative error of queries in W, when the compressed workload is used in the preprocessing phase. Detailed results of the testing are presented in a printed publication entitled "Compressing SQL Workloads" to Chauduri et al which was published Jun. 3, 2002 in Proceedings of the ACM SIGMOD 2002 and is incorporated herein by reference.

While the present invention has been described with a degree of particularity, it is the intent that the invention include all modifications and alterations from the disclosed exemplary embodiment falling within the spirit or scope of the appended claims.

The invention claimed is:

1. A method to compress a workload including a plurality of statements comprising:
    providing a distance function in a database management system for a pair of statements within an initial workload W containing a plurality of statements;
    compressing the initial workload W to generate a compressed workload W' based on the distance function, the compressed workload W' including a subset of statements of the plurality of statements of the initial workload W;
    determining a generation time indicating a length of time to generate the compressed workload W';
    establishing a compressed running time indicating a length of time for an application to run the compressed workload W';
    establishing a total running time of the application indicating a length of time for the application to run the initial workload W; and
    estimating a total running time which includes a sum of the generation time and the compressed running time; and
    determining a limit on the total running time, the limit on the total running time being less then the initial running time; and
    outputting the generated compressed workload W'.

2. The method of claim 1 wherein the compressed workload W' is used by the application and wherein a count of the compressed plurality of statements is less than a count of the initial plurality of statements.

3. The method of claim 1 wherein the compressed workload W' is used by the application, the method further comprising establishing the initial running time which is a running time of the application on the initial workload W.

4. The method of claim 1 wherein the compressed workload W' is used by the application the method further comprising establishing the total running time which is a sum of a running time of the application on the compressed workload W' plus a time taken to generate the compressed workload W'.

5. The method of claim 4 wherein the compressed workload W' is used by the application, the method further comprising establishing the limit on the total running time.

6. The method of claim 1 wherein the limit on the total running time is determined by an estimation of the total running time.

7. The method of claim 1 wherein the estimation of the total running time includes a sum of an estimated execution time for each of the plurality of statements in the compressed workload W' plus a time taken to generate the compressed workload W'.

8. The method of claim 7 wherein the estimated execution time is determined by a query optimizer.

9. The method of claim 7 wherein the estimated execution time is determined using a previous execution time of one or more of the plurality of statements.

10. The method of claim 1 wherein the estimation of the initial running time includes a sum of an estimated execution time for each of the plurality of statements in the initial workload W.

11. The method of claim 10 wherein the estimated execution time is determined by a query optimizer.

12. The method of claim 10 wherein the estimated execution time is determined using a previous execution time of one or more of the plurality of statements in the initial workload W.

13. The method of claim 1 wherein the compressed workload W' contains fewer statements than the initial workload W.

14. A computer system to compress a workload comprising:
    a processor;
    a database management system that receives an initial workload W, the initial workload W including an initial plurality of statements;
    an evaluation component that determines a distance function for a pair of statements within the initial plurality of statements of the initial workload W; and
    a search component which evaluates the distance function and compresses the initial workload W to generate a compressed workload W' including a compressed plurality of statements based on the distance function,
    wherein the database management estimating a total running time including a sum of a running time of an application on the compressed workload W' plus a time taken to generate the compressed workload W' further outputs the compressed workload W'.

15. The system of claim 14 wherein the database management system further estimates an initial running time of the application, the initial running time indicating a length of time for the application to run the initial workload W.

16. The system of claim 14 wherein the computer system further determines a limit on the total running time.

17. The system of claim 14 wherein the compressed workload W' contains fewer statements than the initial workload W.

18. A computer system to compress a workload comprising:

a processor;

a database management system that receives an initial workload W, the initial workload W including an initial plurality of statements;

an evaluation component that determines a distance function for a pair of statements within the initial plurality of statements of the workload W;

a search component which compresses the initial workload W to generate a compressed workload W' including a compressed plurality of statements based on the distance function, the search component estimating:

an initial running time which is a running time of an application on the initial workload W;

a total running time which is a sum of a running time of the application on the compressed workload W' plus a time to generate the compressed workload W'; and a limit on the total running time, the limit on the total running time being less than the initial running time, wherein the database management system receives the comoressed workload W' and outputs the compressed workload W'.

19. The system of claim 18 wherein the limit on the total running time is determined by estimating the total running time.

20. The system of claim 19 wherein the estimation of the total running time is a sum of an estimated execution time for each of the plurality of statements in the compressed workload W' plus the time to generate the compressed workload W'.

21. The system of claim 20 wherein the estimated execution time is determined by a query optimizer.

22. The system of claim 20 wherein the estimated execution time is determined using a previous execution time of one or more of the plurality of statements.

23. The system of claim 18 wherein the initial running time is an estimation of a running time of the application on the initial workload W.

24. The system of claim 23 wherein the estimation of the initial running time is a sum of an estimated execution time for each of the plurality of statements in the initial workload W.

25. The system of claim 24 wherein the estimated execution time is determined by a query optimizer.

26. The system of claim 24 wherein the estimated execution time is determined using a previous execution time of one or more of the plurality of statements.

27. The system of claim 18 wherein the compressed workload W' contains fewer statements than the initial workload W.

28. A computer readable storage medium having executable instructions stored on the medium, the execution of the instruction on a computer, perform the following steps providing a distance function in a database management system for a pair of statements within an initial workload W;

finding a compressed workload W' based on the distance function;

establishing an initial running time of an application on the initial workload W;

establishing a total running time, the total running time being a sum of a running time of the application on the compressed workload W' plus a time to generate the compressed workload W'; and establishing a limit on the total running time, the limit on the total running time being determined by an estimation of the total time running time; and outputting the generated compressed workload W'.

29. The computer readable storage medium of claim 28 having further instructions to establish an initial running time of the application on the initial workload W.

30. The computer readable storage medium of claim 29 wherein the initial workload W includes an initial plurality of statements.

31. The computer readable storage medium of claim 28 having further instructions to establish a total running time which is a sum of a running time of the application on the compressed workload W' plus a time taken to generate the compressed workload W'.

32. The computer readable storage medium of claim 31 wherein the compressed workload W' includes a compressed plurality of statements.

33. The computer readable storage medium of claim 28 having further instructions to establish a limit on the total running time.

34. The computer readable storage medium of claim 28 wherein a count of the compressed plurality of statements is less than a count of the initial plurality of statements.

35. The computer readable storage medium of claim 28 wherein the limit on the total running time is less than the initial running time.

36. The computer readable storage medium of claim 28 wherein the estimation of the total running time is a sum of the estimated execution time for each of the plurality of statements in the compressed workload W' plus the time taken to find the compressed workload W'.

37. The computer readable storage medium of claim 36 wherein the estimated execution time is determined using a previous execution time of one or more of the plurality of statements.

38. The computer readable storage medium of claim 36 wherein the estimated execution time is determined by a query optimizer.

39. The computer readable storage medium of claim 28 wherein the initial running time is taken to be an estimation of a running time of the application on the initial workload W.

40. The computer readable storage medium of claim 39 wherein the estimation of the running time is a sum of an estimated execution time for each of the plurality of statements in the initial workload W.

41. The computer readable storage medium of claim 40 wherein the estimated execution time is determined by a query optimizer.

42. The computer readable storage medium of claim 40 wherein the estimated execution time is determined using a previous execution time of one or more of the plurality of statement in the initial workload W.

43. The computer readable storage medium of claim 28 wherein the compressed workload W' contains fewer statements than the initial Workload W.

* * * * *